June 1, 1937.  F. D. JONES  2,082,247
POWER LIFT IMPLEMENT
Filed March 27, 1935  2 Sheets-Sheet 2
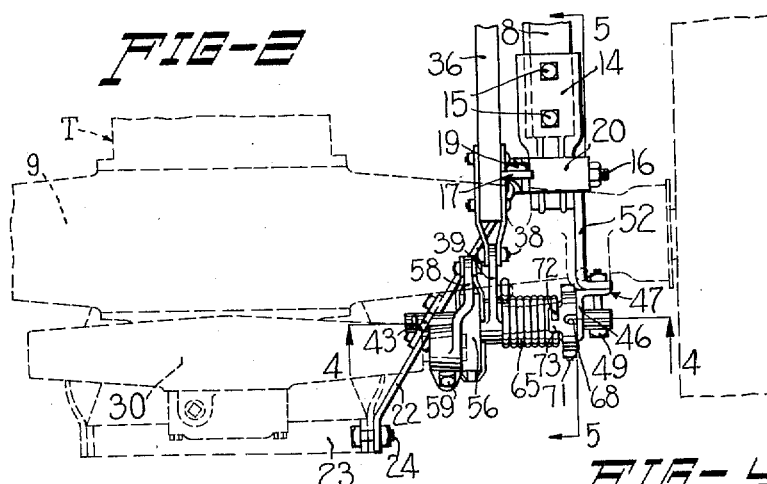
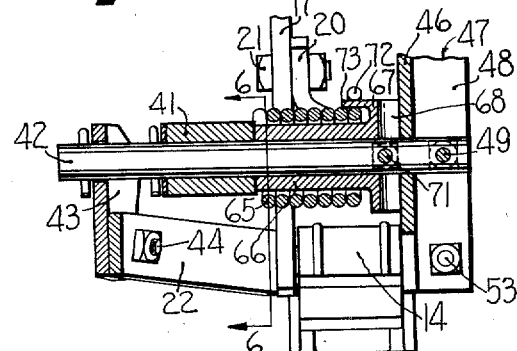
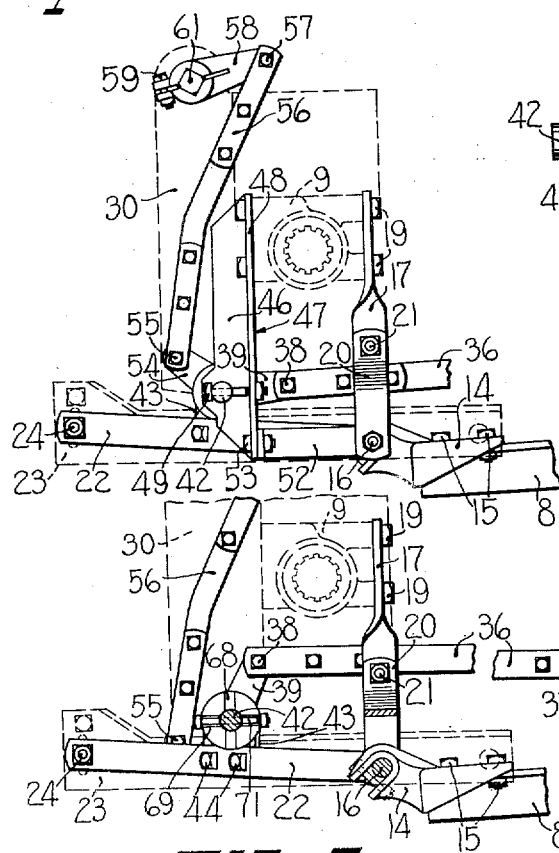
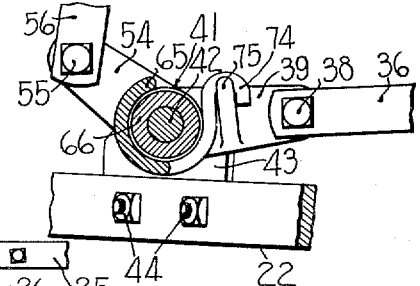
INVENTOR
Frank D. Jones
BY Brown, Jackson, Boettcher + Dienner
ATTORNEYS.

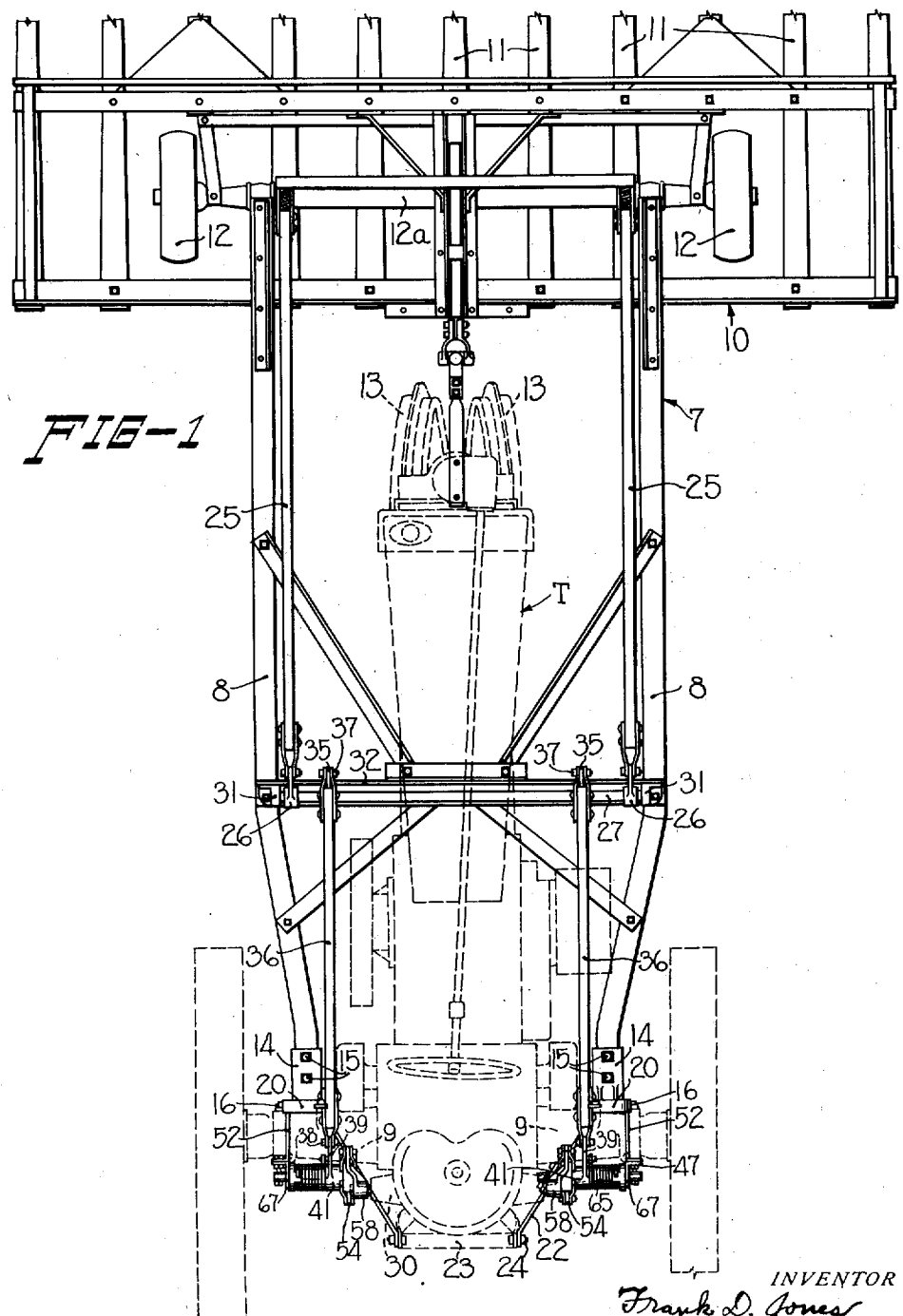

Patented June 1, 1937

2,082,247

UNITED STATES PATENT OFFICE 2,082,247

POWER LIFT IMPLEMENT

Frank D. Jones, Ottumwa, Iowa, assignor to Dain Manufacturing Company of Iowa, Ottumwa, Iowa, a corporation of Iowa Application March 27, 1935, Serial No. 13,234

17 Claims. (Cl. 56—27)

The present invention relates generally to agricultural implements and more particularly is concerned with implements that are supported on a tractor and in which the power for raising and lowering certain operating parts of the implement is derived from the tractor motor.

As is well known, farm tractors are so constructed that various agricultural implements, such as cultivators, corn harvesters, sweep rakes, etc., may be mounted on and supported either entirely or in part by the tractor, and wherein the power for raising certain of the implement parts to a raised or transport position or for lowering them to a working position has been derived from the tractor motor. Implements of this type are usually provided with a lifting rock shaft or equivalent device which is operatively connected with the implement parts whereby rocking of the shaft acts to raise and to lower such parts, the rock shaft being rocked by power derived from the tractor motor through the instrumentality of either a mechanical half revolution type of power lift clutch or by hydraulic lift mechanism. Where a mechanical half revolution type of power lift clutch is employed, the lifting rock shaft is usually locked both in its raised and in its lowered positions, but where certain types of hydraulic lift mechanisms such as that illustrated and described in the application of Elmer McCormick, Milford D. Stewart and Wayne H. Worthington, filed October 24, 1934, Serial No. 749,706, are employed, the lifting rock shaft is locked only in its raised position. One of the advantages of the hydraulic type of power lift mechanism over the mechanical type of power lift clutch is that when the hydraulic mechanism is operated to drop the implement parts to working position the fluid in such mechanism acts to cushion the descent, which is not the case with the mechanical power lift clutch.

In the operation of certain types of agricultural implements, however, not only is it necessary to hold the working tools or equivalent devices in a raised position, but it is also desirable to hold them in a lowered position. An example of such an implement is a sweep rake wherein it is desirable to hold the rake in a lowered position to force the rake teeth to follow closely along the ground surface as well as to hold the rake in a raised position for transport.

It will be apparent from the above, therefore, that where tractors adapted for supporting agricultural implements of various types are equipped with a lift mechanism of the type which is not positively locked in both its raised and lowered position, it is necessary to provide special lifting connections for those implements in which it is necessary to hold the implement in either its raised or its lowered position, and it is the principal object of the present invention, therefore, to provide improved lifting connections between the lift mechanism of the tractor and the lifting rock shaft of the implement whereby the implement may be held in either its raised or its lowered position independently of the lift mechanism.

Other objects and advantageous features will be apparent from the following description of the preferred embodiment of my invention, which has been illustrated in connection with a tractor supported sweep rake although it is to be understood that the invention may be applied to any other type of implement for which it may be adapted.

In the drawings:

Figure 1 is a top plan view of a machine embodying the principles of the present invention and in which the tractor is indicated in dotted lines while the sweep rake attachment is indicated in full lines;

Figure 2 is a fragmentary top plan view on an enlarged scale of the lifting connections at one side of the tractor, the parts being shown in the positions they assume when the rake head is in a lowered position:

Figure 3 is a side elevational view of the lifting connections, as viewed from the right in Figure 2;

Figure 4 is a transverse vertical cross sectional view taken substantially on the plane of the line 4—4 of Figure 2;

Figure 5 is a longitudinal vertical sectional view taken substantially on the plane of the line 5—5 of Figure 2, but with the parts in the positions they assume when the rake head is raised; and Figure 6 is a longitudinal vertical cross-sectional view taken substantially on the plane of the line 6—6 of Figure 4 with the rake head in lowered position.

Referring now to the drawings, the sweep rake illustrated in Figure 1 is indicated as an entirety by the reference numeral 7. The rake is similar in construction to that shown and described in my prior Patent No. 1,967,774, granted to me on July 24, 1934, and therefore only such parts thereof as are necessary for an understanding of the present invention will be referred to herein.

The sweep rake 7 includes two longitudinally extending frame or pushing members 8, 8, disposed on opposite sides of the tractor with their rear ends connected as hereinafter described to the rear axle housing 9 of the tractor T, and a rake 10 which comprises a series of forwardly extending raker bars or teeth 11 fixedly connected to and forming a part of the rake head 10. The rake head 10, in connection with the rake frame 7, constitutes an implement frame which is supported, at least in part, by laterally spaced dirigible wheels 12 and cooperating axle means 12a. The dirigible supporting wheels 12 are connected with the front steering wheels 13 of the tractor T in substantially the same way as that illustrated in my above mentioned patent to which reference may be had if desired.

The rear ends of each of the two frame or pushing members 8 of the rake are supported on the tractor in substantially the same way, and, therefore, the mounting of but one of said members will be described herein. A suitable journal casting 14 is fixed to the rear end of the member 8 by means of bolts 15 (see Figures 1, 3, and 5). This journal casting 14 is removably connected with and journaled upon a transversely extending pivot pin or bolt 16 supported by means of a bracket 17 secured to the rear axle housing 9 of the tractor by means of bolts 19 (see Figures 3 and 5). This pivot pin extends through alined perforations in the lower portion of the bracket 17 and the lower portion of a strap 20 which, at its upper end, is bolted or otherwise secured to the bracket 17, as shown at 21 in Figures 3 and 5, and has its lower end spaced from the lower end of the bracket 17, the journal casting 14 being journaled on the pivot pin between said bracket and said strap. The bracket 17 is braced by means of a suitable brace bar or member 22 having one end bolted or otherwise suitably secured to the lower end of the bracket 17 and having its other end secured to the draw bar 23 of the tractor by a bolt 24.

The rake head 10 is adapted to be rocked or tilted about an axis passing through the wheels 12 to raise and lower the front ends of the teeth 11, and to this end a pair of longitudinally extending bars 25 are provided. At their forward ends the bars are connected to the rake head frame at points above the wheels 12, as clearly shown in my prior patent mentioned above, and at their rear ends the bars 25 are pivotally connected to arms 26 carried by a lifting rock shaft 27, by the rocking of which the rake head may be raised and lowered. This rock shaft is operated by power derived from the hydraulic lift mechanism 30 on the tractor by means of two sets of connections, one set being disposed on each of the tractor as shown in Figure 1. Also, as shown in Figure 1, the rock shaft 27 extends transversely across the implement 7 and is rockably supported at its opposite ends in bearings 31 which are carried by a transverse frame member 32 secured at its opposite ends in any suitable manner to the push members 8.

As the two sets of connections between the hydraulic lift mechanism and the lifting rock shaft 27 are identical in construction, but one of such sets of connections will be described herein. Each of said connections includes an arm 35 fixed in any suitable manner to the rock shaft 27 and extending upwardly therefrom adjacent the outer end thereof, as shown in Figures 1 and 5. The forward end of a longitudinally extending link 36 is pivotally connected to the upper end of the rock shaft arm 35 as shown at 37, the rear end of said link being pivotally connected, as at 38, with the outer end of an arm 39 preferably but not necessarily formed integral with and extending outwardly from a hub member in the form of a suitable casting 41 journaled on a pin or shaft 42, as best shown in Figures 4 and 6.

The pin or shaft 42 is supported at its inner end in a perforation in a bracket 43 fixedly connected to the brace bar 22 by means of bolts 44 and extending upwardly therefrom as shown in Figures 4 and 6. Adjacent its outer end the shaft 42 extends through a perforation in one flange 46 of a vertically positioned angle iron bracket or frame member 47 suitably fixed to the rear axle housing 9 by means of the bolts 19, which extend through perforations in the other flange 48 of said bracket. The shaft 42 is fixed in position in the bracket 47 by means of a bolt 49 which extends through a perforation in the flange 48 of the bracket and through a perforation in the shaft 42, as best shown in Figures 3 and 4.

A brace bar 52 is bolted at its rear end to the lower end of the flange 48 of the bracket 47, as shown at 53, and has its forward end bolted or otherwise secured in any suitable manner (not shown) to the lower end of the strap 20 which supports the outer end of the pin 16. The brace bar 52 thus acts to hold the lower ends of the bracket 47 and strap 20 in proper spaced relation relative to each other at all times. Formed integral with and extending outwardly from the hub member 41 is an arm 54, the outer end of which is pivotally connected at 55 to the lower end of a link 56, the upper end of which is pivotally connected at 57 with the outer end of an arm 58 fixedly connected at its inner end, as shown at 59, to the outer end of the lifting rock shaft 61 of the hydraulic power lift mechanism. The member 41, in effect, serves as a pivotally mounted connecting bell crank having arm portions 39 and 54.

In Figure 5 the lifting connections are shown in the positions they occupy when the rake head is in its lifted or transport position, and when the power lift is tripped to permit the rake head to drop to raking position the parts assume the positions approximately like those shown in Figure 3. In order to hold the rake head in such lowered raking position, a coiled torsion spring 65 is provided, said spring being supported upon a cylindrical casting or sleeve member 66 mounted upon the pin 42 between the hub member 41 and the flange 46 of the angle bracket 47. The end of the casting 66 adjacent the flange 46 is provided with a radially extending flange 67 formed integral therewith and having two transversely extending slots or recesses 68 and 69 in its outer surface extending at right angles to each other, each of said recesses being adapted to receive a bolt 71 which passes through a perforation provided in the shaft 42.

As shown in Figures 4 and 5 the bolt 71 is positioned in the recess 69 in the flange. The purpose of this bolt and slot construction will be described later. The outer end 72 of the spring 65 is looped around a lug 73 formed integral with and extending inwardly from the outer edge of the flange 67, as best shown in Figures 2 and 4, and the inner end 74 of the spring is looped over a lug 75 formed integral with or otherwise suitably secured to the arm 39 as shown in Figure 6.

The rake head 10 is lowered by tripping the power lift which opens a valve and permits the arms 58 to swing upwardly from the position shown in Figure 5 to the position shown in Figure 6 under the effect of the weight of the rake head, transmitted to the arms 39 by the links 25 and 36, and the springs 65 which urge the arms 39 toward the position shown in Figures 3 and 6. The angular relations between the several parts are such that when the rake teeth are in a position normally engaging the ground the lifting link 36 and the associated arm 39 at each side of the machine are in a substantially dead center relationship. The springs 65, which bias the parts for movement to this position, can then exert sufficient force against any rearward thrusts imposed thereon by the links 36 to hold the lifting connections in this position and the rake teeth down against the ground.

The springs 65 are arranged to aid in moving the parts toward and holding them in the position shown in Figures 3 and 6, after the power lift has been actuated to move the rake head and associated parts to lowered position. Hence, in the illustrated arrangement it is not necessary to rely upon the power lift mechanism itself to hold the rake head down, since a rearward thrust on the links 36 cannot exert any great amount of turning effect upon the arms 39 and hub member 41, by virtue of the aforesaid dead center relationship. However, the springs should be arranged so as not to exert too small a force, or the parts will not reach the position shown in Figures 3 and 6, and likewise the springs 65 should not exert too much force or the parts will be swung well beyond their dead center relationship with the result that the rake teeth may not be held down against the ground. In order, therefore, to provide for adjusting the tension of the spring 65 at each side of the machine, slots 68 and 69 are formed in the outer surface of the flange 67 of the spring supporting cylindrical casting 66, in either of which slots the bolt 71 may be positioned. Thus the tension of each spring 65 may be changed by removing the bolt 71 and rotating the casting 66 on the pin 42 through 90 degrees, or multiples thereof, in either direction until the desired tension in the spring has been secured, after which the bolt 71 may be replaced either in the recess 68 or in the recess 69, as the case may be, to lock the casting 66 against further rotation on the pin 42. This adjusting means also provides for taking care of fluctuations that may occur in the strength of the springs in the manufacture thereof and for compensating for weakening of the springs and wear of the various parts through use.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

It is also to be understood that while I have illustrated and described my invention in connection with a sweep rake, the invention is also applicable to any other type of tractor implement having one or more operating members adapted to be raised and lowered, as will be readily apparent to those skilled in the art, and it will also be apparent that the principles of the present invention are equally applicable to machines having a manual lift instead of a power lift, or to the locking type of power lift. In the latter case the power lift mechanism would be relieved of the duty of holding the implement parts in a given position.

What I claim is:—

1. An agricultural machine comprising parts adapted to be moved into either of two positions, means for moving said parts from one position to another, link means cooperating therewith and adapted to be brought into a dead center relationship when said parts have been moved to one of its positions, whereby said link means serves to hold said parts in said one position, and spring means tending to move said link means into said dead center relationship.

2. In an agricultural machine comprising a tractor having a power lift and an implement connected with the tractor and comprising parts adapted to be moved into either of two positions, the combination of means connected with said power lift for moving said parts from one position to another including link means through which the force moving said parts is transmitted and which are adapted to be brought into a dead center relationship when said power lift has acted therethrough to move said parts to one position, whereby said link means serves to hold said parts in said one position independently of said power lift.

3. In an agricultural machine comprising a tractor having a power lift and an implement connected with the tractor and comprising parts adapted to be moved into either of two positions, the combination of longitudinally extending link means operatively connected with said parts, means serving as a bell crank having one arm portion pivotally connected with said link means so that, in one position of said parts, said bell crank portion and said link means move into substantially dead center relationship, and means operatively connecting the other arm portion of said bell crank with said power lift.

4. In an agricultural machine comprising a tractor having a power lift, an implement connected with the tractor and comprising parts adapted to be moved into either of two positions, the combination of a pair of generally longitudinally extending links operatively connected to move said parts, rocking means carried by the tractor and including a pair of arms operatively connected with said links, said links being adapted to move into dead center relationship with said arms in one position of said parts, and means operatively connecting said power lift with said rocking means.

5. An implement including operating members adapted to be moved into either of two positions, comprising the combination of a tractor having a power lift mechanism, and means connecting said members with said power lift mechanism whereby said members are moved to said two positions by actuation of said mechanism, said mechanism being locked only in one position of said members, said connecting means including means for locking said members in their other position.

6. An implement including operating members adapted to be moved into either a raised or a lowered position comprising the combination of a tractor having a power lift mechanism, and means connecting said members with said power lift mechanism whereby said members are raised and lowered by actuation of said mechanism, said mechanism being locked only in the raised position of said members, said connecting means including means for locking said members only in their lowered position.

7. An implement including operating members adapted to be moved into either a raised or a lowered position, comprising the combination of a tractor having a hydraulic lift mechanism, and means connecting said members with said hydraulic lift mechanism whereby said members are raised and lowered by actuation of said mechanism, said mechanism being locked only in the raised position of said members, said connecting means including a spring for forcing said members into a locked position when they are lowered.

8. A rake including a rake head adapted to be moved into either a raised or a lowered position, comprising the combination of a tractor having a hydraulic lift mechanism, means connecting said rake head with said hydraulic lift mechanism whereby said rake head is raised and lowered by actuation of said mechanism, said mechanism being locked only in one position of said rake head, said connecting means including means for locking said rake head in its other position.

9. A rake including a rake head adopted to be moved into either a raised or a lowered position, comprising the combination of a tractor having a hydraulic lift mechanism, and means connecting said rake head with said hydraulic lift mechanism whereby said rake head is raised and lowered by actuation of said mechanism, said mechanism being locked only in the raised position of said rake head and said connecting means including a link, a pivoted member, and an arm formed integral with said member and adapted to be moved into a substantially dead center relation with said link to lock said rake head in its lowered position when moved to such position.

10. A rake including a rake head adapted to be moved into either a raised or a lowered position, comprising the combination of a tractor having a hydraulic lift mechanism, means connecting said rake head with said hydraulic lift mechanism whereby said rake head is raised and lowered by actuation of said mechanism, said mechanism being locked only in the raised position of said rake head and said connecting means including a link pivotally connected at one end with said rake head, a pivoted member, and an arm integral with said member pivotally connected with the other end of said link and adapted to be moved into a substantially dead center relation with said link to lock said rake head in its lowered position when moved to such position, and a spring operable to force said arm and said link into such dead center relation.

11. A rake including a rake head adapted to be moved into either a raised or a lowered position, comprising the combination of a tractor having a hydraulic lift mechanism whereby said rake head is raised and lowered by actuation of said mechanism, said mechanism being locked only in the raised position of said rake head, said connecting means including a link pivotally connected at one end with said rake head, a pivoted hub member, and an arm integral with said hub member pivotally connected with the other end of said link and adapted to be moved into a substantially dead center relation with said link to lock said rake head in its lowered position when moved to such position, a spring operable to force said arm and said link into such dead center relation, and means for changing the tension of said spring.

12. A rake including a frame and a rake head supported on said frame and adapted to be raised and lowered, comprising the combination of a tractor having a hydraulic lift mechanism, a rock shaft journaled on the rake frame and connected with said rake head, and means connecting said hydraulic lift mechanism with said rock shaft for rocking said shaft to raise and lower said rake head, said hydraulic lift mechanism being locked in one position to hold said rock shaft against rocking movement in one position of said rake head, said connecting means including means for locking said rock shaft against rocking movement in the other position of said rake head.

13. A rake including a frame and a rake head supported on said frame and adapted to be raised and lowered, comprising the combination of a tractor having a hydraulic lift mechanism, a rock shaft journaled on the rake frame and connected with said rake head, means connecting said hydraulic lift mechanism with said rock shaft for rocking said shaft to raise and lower said rake head, said hydraulic lift mechanism being locked in one position to hold said rock shaft against rocking movement in one position of said rake head, said connecting means including means for locking said rock shaft against movement in the other position of said rake head, said latter means including a hub member pivotally mounted on a fixed axis, an arm integral with said hub member, and a link pivotally connected at one end with said arm and at its other end with an arm on said rock shaft, said link being moved into a dead center relation with the arm on said hub member.

14. A rake including a rake head adapted to be moved into either a raised or a lowered position, comprising the combination of a tractor having a hydraulic lift mechanism, means connecting said rake head with said hydraulic lift mechanism whereby said rake head is raised and lowered by actuation of said mechanism, said mechanism being locked only in the raised position of said rake head, said connecting means including a link pivotally connected at one end with said rake head, a fixedly mounted pivot shaft, a hub member journaled on said shaft, and an arm fixed to said hub member pivotally connected to the other end of said link and adapted to be moved into a substantially dead center relation with said link to lock said rake head in its lowered position when moved to such position, a sleeve member journaled on said pivot shaft adjacent said hub member, a coiled spring carried by said sleeve member, one end of said spring being fixed to said sleeve member and having its other end fixed to the arm on the hub member, and means for adjusting the tension of said spring, said adjusting means being operable to lock said sleeve against rotation on said pivot shaft whereby said spring will hold said arm and said link in a dead center relation.

15. A rake including a rake head adapted to be moved into either a raised or a lowered position, comprising the combination of a tractor having a hydraulic lift mechanism, means connecting said rake head with said hydraulic lift mechanism whereby said rake head is raised and lowered by actuation of said mechanism, said mechanism being locked only in the raised position of said rake head, said connecting means including a link pivotally connected at one end with said rake head, a fixedly mounted pivot shaft, a hub member journaled on said shaft, and an arm fixed to said hub member pivotally connected to the other end of said link and adapted to be moved into a substantially dead center relation with said link to lock said rake head in its lowered position when moved to such position, a sleeve member journaled on said pivot shaft adjacent said hub member, a coiled spring carried by said sleeve member, one end of said spring being fixed to said sleeve member and having its other end fixed to the arm on the hub member, means for adjusting the tension of said spring comprising a flange at one end of said sleeve, transversely extending grooves in said flange, and a bolt adapted to be positioned in either of said grooves and extending through a perforation in said pivot shaft.

16. The combination with a tractor having a power lift that includes an operating part movable from one position to another and locked against movement in one position and freely movable in the other, of an implement having a part to be raised and lowered, an arm connected with the power lift part, a link pivotally connected with said arm and said implement part, said power lift part being connected with said arm so as to exert a pull on said link to raise said implement as said power lift is moved into its locked position, whereby said power lift holds said implement part in raised position, said arm and link moving into dead center relation when said power lift is moved into its freely movable position to lower the implement part, whereby said arm and link, acting as a toggle, hold the implement part in its lowered position.

17. The combination with a tractor having a power lift and includes an operating part movable from one position to another and locked against movement in one position and freely movable in the other, of an implement having a part to be raised and lowered, an arm connected with the power lift part, a link pivotally connected with said arm and said implement part, said power lift part being connected with said arms so as to exert a pull on said link to raise said implement as said power lift is moved into its locked position, whereby said power lift holds said implement part in raised position, and spring means acting against said arm for swinging the same into substantially dead center relation with respect to said link, so as to hold said implement part in lowered position, whenever the power lift is actuated to move said power lift part into its freely movable position.

FRANK D. JONES.

CERTIFICATE OF CORRECTION.

Patent No. 2,082,247. June 1, 1937.

FRANK D. JONES.

It is hereby certified that error appears in the printed specification of the above numbered patent requiring correction as follows: Page 1, second column, line 2, for "position" read positions; page 2, first column, line 6, after "rake" insert head; page 4, first column, line 27, claim 9, for "adopted" read adapted; page 5, second column, line 12, claim 17, for "and" read that; and that the said Letters Patent should be read with these corrections therein that the same may conform to the record of the case in the Patent Office.

Signed and sealed this 14th day of September, A. D. 1937.

Henry Van Arsdale (Seal)   Acting Commissioner of Patents.

said mechanism being locked only in the raised position of said rake head, said connecting means including a link pivotally connected at one end with said rake head, a fixedly mounted pivot shaft, a hub member journaled on said shaft, and an arm fixed to said hub member pivotally connected to the other end of said link and adapted to be moved into a substantially dead center relation with said link to lock said rake head in its lowered position when moved to such position, a sleeve member journaled on said pivot shaft adjacent said hub member, a coiled spring carried by said sleeve member, one end of said spring being fixed to said sleeve member and having its other end fixed to the arm on the hub member, means for adjusting the tension of said spring comprising a flange at one end of said sleeve, transversely extending grooves in said flange, and a bolt adapted to be positioned in either of said grooves and extending through a perforation in said pivot shaft.

16. The combination with a tractor having a power lift that includes an operating part movable from one position to another and locked against movement in one position and freely movable in the other, of an implement having a part to be raised and lowered, an arm connected with the power lift part, a link pivotally connected with said arm and said implement part, said power lift part being connected with said arm so as to exert a pull on said link to raise said implement as said power lift is moved into its locked position, whereby said power lift holds said implement part in raised position, said arm and link moving into dead center relation when said power lift is moved into its freely movable position to lower the implement part, whereby said arm and link, acting as a toggle, hold the implement part in its lowered position.

17. The combination with a tractor having a power lift and includes an operating part movable from one position to another and locked against movement in one position and freely movable in the other, of an implement having a part to be raised and lowered, an arm connected with the power lift part, a link pivotally connected with said arm and said implement part, said power lift part being connected with said arms so as to exert a pull on said link to raise said implement as said power lift is moved into its locked position, whereby said power lift holds said implement part in raised position, and spring means acting against said arm for swinging the same into substantially dead center relation with respect to said link, so as to hold said implement part in lowered position, whenever the power lift is actuated to move said power lift part into its freely movable position.

FRANK D. JONES.

CERTIFICATE OF CORRECTION.

Patent No. 2,082,247. June 1, 1937.

FRANK D. JONES.

It is hereby certified that error appears in the printed specification of the above numbered patent requiring correction as follows: Page 1, second column, line 2, for "position" read positions; page 2, first column, line 6, after "rake" insert head; page 4, first column, line 27, claim 9, for "adopted" read adapted; page 5, second column, line 12, claim 17, for "and" read that; and that the said Letters Patent should be read with these corrections therein that the same may conform to the record of the case in the Patent Office.

Signed and sealed this 14th day of September, A. D. 1937.

Henry Van Arsdale (Seal) Acting Commissioner of Patents.

CERTIFICATE OF CORRECTION.

Patent No. 2,082,247.

June 1, 1937.

FRANK D. JONES.

It is hereby certified that error appears in the printed specification of the above numbered patent requiring correction as follows: Page 1, second column, line 2, for "position" read positions; page 2, first column, line 6, after "rake" insert head; page 4, first column, line 27, claim 9, for "adopted" read adapted; page 5, second column, line 12, claim 17, for "and" read that; and that the said Letters Patent should be read with these corrections therein that the same may conform to the record of the case in the Patent Office.

Signed and sealed this 14th day of September, A. D. 1937.

Henry Van Arsdale

Acting Commissioner of Patents.

(Seal)